(12) United States Patent
Kim et al.

(10) Patent No.: US 11,178,551 B2
(45) Date of Patent: Nov. 16, 2021

(54) METHOD AND DEVICE FOR TRANSMITTING POSITIONING REFERENCE SIGNAL

(71) Applicant: LG ELECTRONICS INC., Seoul (KR)

(72) Inventors: Myeongjin Kim, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/642,856

(22) PCT Filed: Aug. 31, 2017

(86) PCT No.: PCT/KR2017/009528
§ 371 (c)(1),
(2) Date: Feb. 27, 2020

(87) PCT Pub. No.: WO2019/045141
PCT Pub. Date: Mar. 7, 2019

(65) Prior Publication Data
US 2021/0076225 A1    Mar. 11, 2021

(51) Int. Cl.
*H04W 16/28* (2009.01)
*H04B 7/06* (2006.01)
*H04L 5/00* (2006.01)
*H04W 64/00* (2009.01)
*H04W 80/02* (2009.01)

(52) U.S. Cl.
CPC .......... *H04W 16/28* (2013.01); *H04B 7/0617* (2013.01); *H04L 5/0051* (2013.01); *H04W 64/003* (2013.01); *H04W 80/02* (2013.01)

(58) Field of Classification Search
CPC .................................................. H04W 16/28
See application file for complete search history.

(56) References Cited

U.S. PATENT DOCUMENTS

2014/0349677 A1   11/2014  Xiao et al.
2015/0257121 A1*   9/2015  Siomina ............... G01S 5/0226
                                                    455/456.6
(Continued)

FOREIGN PATENT DOCUMENTS

WO     2016099079    6/2016
WO     2017007386    1/2017

OTHER PUBLICATIONS

PCT International Application No. PCT/KR2017/009528, Written Opinion of the International Searching Authority dated May 24, 2018, 17 pages.

(Continued)

*Primary Examiner* — Fahmida S Chowdhury
(74) *Attorney, Agent, or Firm* — Lee, Hong, Degerman, Kang & Waimey

(57) ABSTRACT

A method for a base station to transmit a positioning reference signal (PRS) in a wireless communication system may be provided according to an embodiment in the present specification. Here, the method for transmitting a PRS may comprise: a step of transmitting PRS occasion configuration information; and a step of transmitting a PRS in each PRS occasion on the basis of the PRS occasion configuration information. Here, the PRS occasion configuration information may include information about beams used in the respective PRS occasions, and the PRS may be transmitted as the beams used in the respective PRS occasions are swept.

11 Claims, 22 Drawing Sheets

(56) References Cited

U.S. PATENT DOCUMENTS

| | | | | |
|---|---|---|---|---|
| 2017/0264415 | A1* | 9/2017 | Wiberg | H04B 7/0617 |
| 2017/0366244 | A1* | 12/2017 | Lee | H04B 7/0619 |
| 2018/0097596 | A1* | 4/2018 | Palanivelu | H04L 5/0048 |
| 2018/0098187 | A1* | 4/2018 | Blankenship | G01S 5/02 |
| 2019/0044677 | A1* | 2/2019 | Ly | H04B 7/0617 |
| 2019/0068315 | A1* | 2/2019 | Ryden | G01S 1/0423 |
| 2020/0021946 | A1* | 1/2020 | Kumar | G01S 5/0236 |
| 2020/0137714 | A1* | 4/2020 | Kumar | H04W 24/10 |
| 2020/0351047 | A1* | 11/2020 | Akkarakaran | H04L 61/6022 |

OTHER PUBLICATIONS

Huawei, et al., "Design of new downlink positioning reference signal for NB-IoT", 3GPP TSG RAN WG1 Meeting #86bis, R1-1608618, Oct. 2016, 7 pages.
3rd Generation Partnership Project (3GPP), "Technical Specification Group Radio Access Network; Evolved Universal Terrestrial Radio Access (E-UTRA) Physical channels and modulation (Release 14)," 3GPP TS 36.211 V14.3.0, Jun. 2017, 49 pages.
European Patent Office Application Serial No. 17923560.1, Search Report dated Feb. 24, 2021, 10 pages.
Qualcomm Incorporated, "OTDOA positioning reference signal," R1-1702547, 3GPP TSG RAN WG1 Meeting #88, Feb. 2017, 4 pages.
Samsung, "The Impact of Beam Sweeping on RRM Measurement," R2-1709606, 3GPP TSG RAN WG2 #99, Aug. 2017, 4 pages.
LG Electronics, "Discussions on Possible Techniques for NR Positioning," R1-1812595, 3GPP TSG RAN WG1 Meeting #95, Nov. 2018, 8 pages.

* cited by examiner

METHOD AND DEVICE FOR TRANSMITTING POSITIONING REFERENCE SIGNAL

CROSS-REFERENCE TO RELATED APPLICATIONS

This application is the National Stage filing under 35 U.S.C. 371 of International Application No. PCT/KR2017/009528, filed on Aug. 31, 2017, the contents of which are all hereby incorporated by reference herein in its entirety.

TECHNICAL FIELD

The present disclosure relates to a wireless communication system, and more particularly, to a method and device for transmitting a positioning reference signal (PRS).

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

3 GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms. The 5G technology requires an eNB to have more UE connectivity and it is anticipated that the connectivity required by the 5G is going to be increased up to maximum 1,000,000/km2.

As more communication devices require greater communication capacity, necessity for mobile broadband communication, which is enhanced compared to a legacy radio access technology (RAT), is emerging. Moreover, discussion on a communication system to be designed in consideration of a service/UE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

DISCLOSURE

Technical Problem

An object of the present disclosure is to provide a method by which a base station transmits a positioning reference signal (PRS) in a wireless communication system.

Another object of the present disclosure is to provide a method by which a base station transmits a PRS based on beamforming in a wireless communication system.

A further object of the present disclosure is to provide a method of improving the accuracy of positioning in a wireless communication system.

Technical Solution

In an aspect of the present disclosure, provided is a method of transmitting a positioning reference signal (PRS) by a base station in a wireless communication system. The PRS transmission method may include transmitting PRS occasion configuration information and transmitting the PRS on each PRS occasion based on the PRS occasion configuration information. The PRS occasion configuration information may include information on beams used on each PRS occasion. The PRS may be transmitted by sweeping the beams used on each PRS occasion.

In another aspect of the present disclosure, provided is a base station for transmitting a positioning reference signal (PRS) in a wireless communication system. The base station may include a receiving module configured to receive a signal, a transmitting module configured to transmit a signal, and a processor configured to control the receiving module and the transmitting module. The processor may be configured to control the transmitting module to transmit PRS occasion configuration information and control the transmitting module to transmit the PRS on each PRS occasion based on the PRS occasion configuration information. The PRS occasion configuration information may include information on beams used on each PRS occasion. The PRS may be transmitted by sweeping the beams used on each PRS occasion.

The followings are commonly applicable to the method and device for transmitting a PRS in a wireless communication system.

The beams may be swept on a PRS subframe basis in the PRS occasion.

When the number of beams used by the base station is greater than the number of PRS subframes in the PRS occasion, the PRS may be transmitted by sweeping beams indicated by the PRS occasion configuration information among the beams used by the base station on a first PRS occasion and sweeping remaining beams on a second PRS occasion.

A first beam may be configured in all PRS subframes in the PRS occasion.

The first beam may cover entire coverage of the base station.

First and second PRSs may be respectively assigned to first and second regions on each PRS occasion. The first PRS may be a PRS for all in-coverage user equipments (UEs), and the second PRS may be a UE-dedicated PRS for a specific UE.

The first PRS may be transmitted by sweeping beams indicated by the PRS occasion configuration information among beams used by the base station in the first region on a first PRS occasion and sweeping remaining beams in the first region on a second PRS occasion.

The second PRS may be transmitted by sweeping predetermined beams based on beamforming.

The second PRS may be transmitted by sweeping the beams used in the beamforming both in the second region on a first PRS occasion and in the second region on a second PRS occasion.

The base station may calculate the number of UEs having received power greater than or equal to a threshold for each available beam of the base station, and the beams used in the beamforming may be determined based on the number of the UEs.

The PRS occasion configuration information may be signaled by a physical layer signal or a higher layer signal.

Advantageous Effects

The present disclosure may provide a method by which a base station transmits a positioning reference signal (PRS) in a wireless communication system.

The present disclosure may provide a method by which a base station transmits a PRS based on beamforming in a wireless communication system.

The present disclosure may provide a method of improving the accuracy of positioning in a wireless communication system.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE

Figure 1:
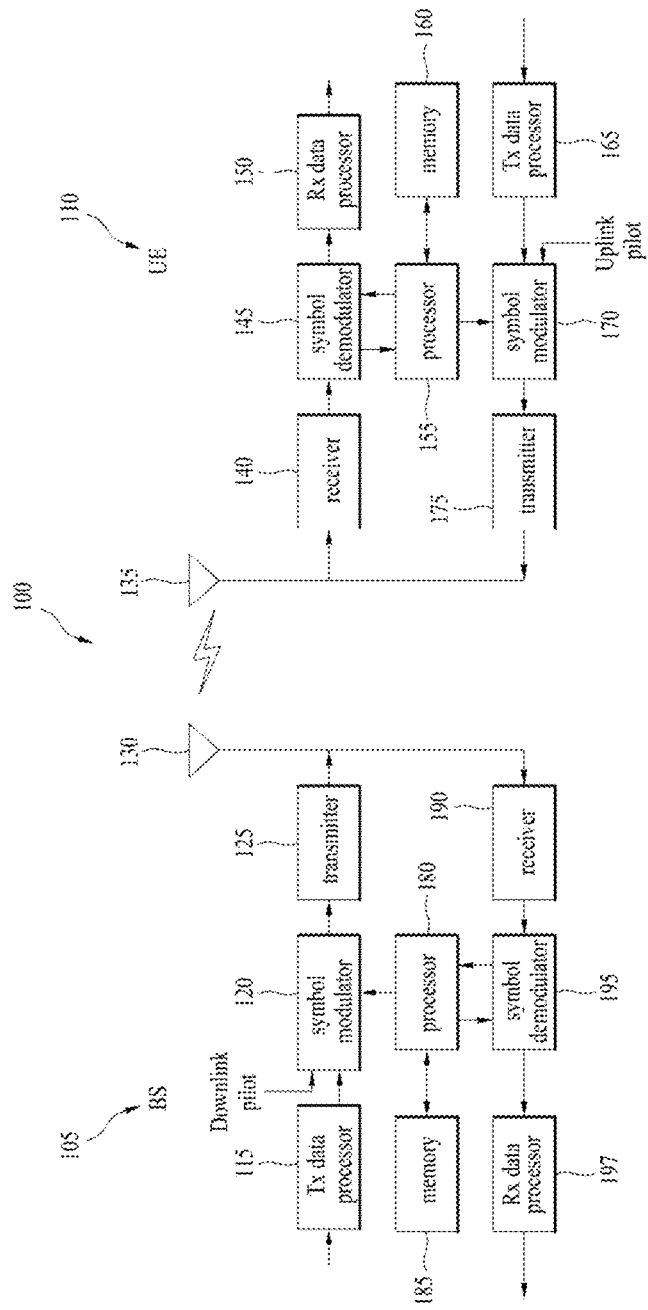
FIG. 1 is a block diagram illustrating configurations of a base station 105 and user equipment 110 (or drone) in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE. Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

In some cases, to avoid obscuring the concept of the present disclosure, structures and/or devices known to the public may be omitted or represented as a block diagram focusing on the core functions of the structures and/or devices. In addition, the same reference numbers will be used throughout the drawings to refer to the same or like parts in this specification.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present disclosure may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS).

The 3GPP LTE is a part of an evolved UMTS (E-UMTS) that uses E-UTRA. The 3GPP LTE adopts OFDMA in a downlink and SC-FDMA in an uplink. LTE-advanced (LTE-A) is an evolved version of the 3GPP LTE.

Moreover, in the following description, specific terminologies are provided to help the understanding of the present disclosure. And, the use of the specific terminology can be modified into another form within the scope of the technical idea of the present disclosure.

Regarding wireless transmission between a BS and a UE, transmission from the BS to the UE and transmission from the UE to the BS are referred to as DL transmission and UL transmission, respectively. A scheme of distinguishing between radio resources for DL and UL transmission is defined as duplex. When frequency bands are divided into DL transmission bands and UL transmission bands to perform bidirectional transmission and reception, it is referred to as frequency division duplex (FDD). In addition, when time resources are divided into DL transmission resources and UL transmission resources to perform the bidirectional transmission and reception, it is referred to as time division duplex (TDD). When time and frequency resources are shared to perform the bidirectional transmission and reception, it is referred to as full duplex. It is apparent that the method proposed in the present disclosure operates not only in the FDD but also in the TDD or full duplex.

FIG. 1 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 1, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197.

And, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present disclosure supports a Multiple Input Multiple Output (MIMO) system. And, the BS 105 according to the present disclosure may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel. Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
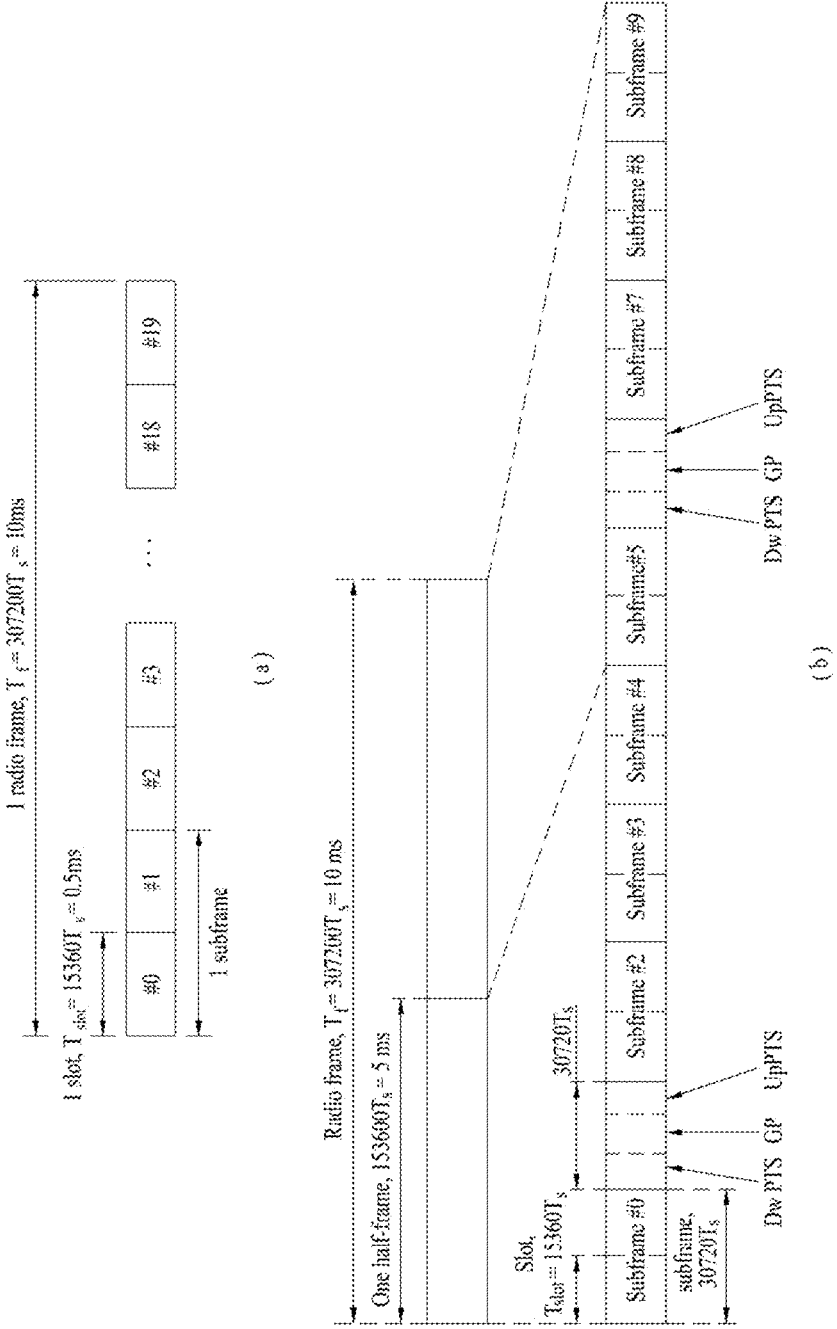
FIG. 2 illustrates a structure of a radio frame used in a wireless communication system.

FIG. 2 is a diagram for an example of a radio frame structure used in a wireless communication system. Specifically, FIG. 2 (*a*) illustrates an exemplary structure of a radio frame which can be used for frequency division multiplexing (FDD) in 3GPP LTE/LTE-A system and FIG. 2 (*b*) illustrates an exemplary structure of a radio frame which can be used for time division multiplexing (TDD) in 3GPP LTE/LTE-A system.

Referring to FIG. 2, a 3GPP LTE/LTE-A radio frame is 10 ms (307,200 Ts) in duration. The radio frame is divided into 10 subframes of equal size. Subframe numbers may be assigned to the 10 subframes within one radio frame, respectively. Here, Ts denotes sampling time where Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | D | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time period reserved for DL transmission and UpPTS is a time period reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
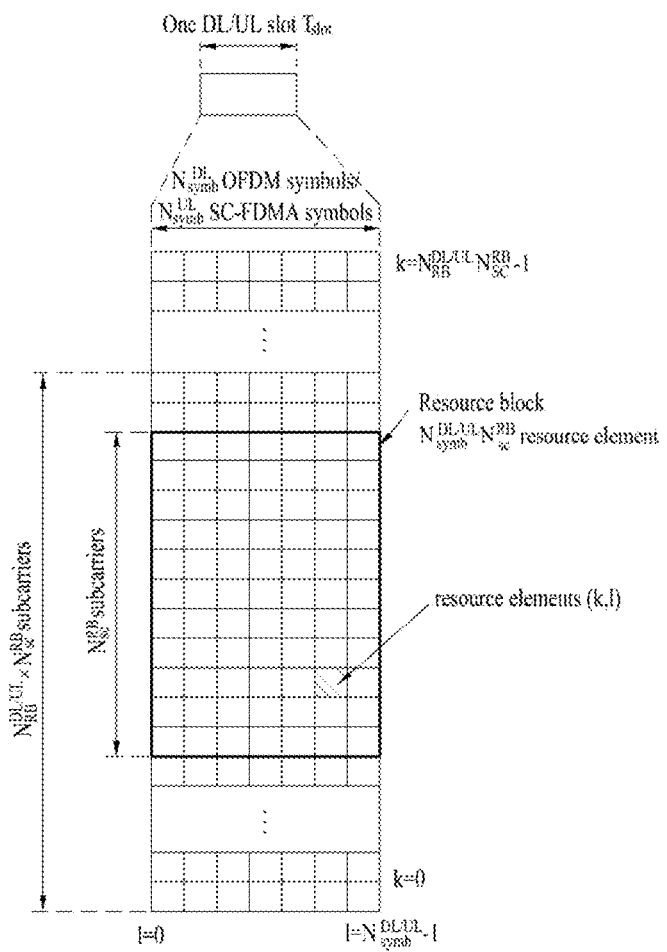
FIG. 3 illustrates structures of downlink/uplink (DL/UL) slots of a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 3, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present disclosure are similarly applicable to subframes having a different number of OFDM symbols. Referring to FIG. 3, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}RB * N^{RB}_{sc} - 1$ in the frequency domain, and l is an index ranging from 0 to $N^{DL/UL}_{symb} 1 - 1$ in the time domain. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). A VRB corresponds to a logical resource allocation unit which is introduced to allocate a resource. The VRB has a size identical to a size of a PRB. The VRB is classified into a localized type VRB and a distributed type VRB according to a scheme of mapping the VRB to a PRB. Since VRBs of the localized type are directly mapped to PRBs, a VRB number (or VRB index) directly corresponds to a PRB number. In particular, it becomes $n_{PRB} = n_{VRB}$. Numbers ranging from 0 to $N^{DL}_{PRB} - 1$ are assigned to the VRBs of the localized type and $N^{DL}_{VRB} = N^{DL}_{RB}$. Hence, according to the localized mapping scheme, a VRB having the same VRB number is mapped to a PRB of the same PRB number in a first slot and a second slot. On the contrary, a VRB of the distributed type is mapped to a PRB by passing through interleaving. Hence, a VRB of the distributed type including the same VRB number can be mapped to PRBs of a different number in a first slot and a second slot. Two PRBs each of which is located at each slot of a subframe and having the same VRB number are referred to as a VRB pair.

Figure 4:
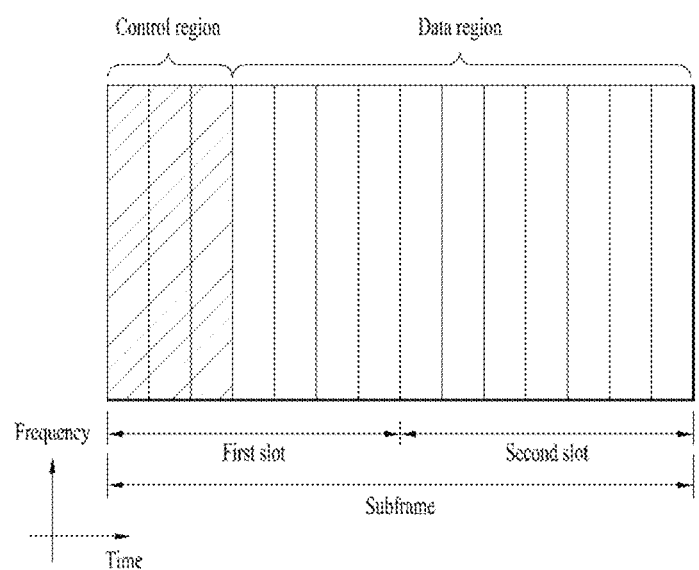
FIG. 4 illustrates a structure of a downlink (DL) subframe used in 3GPP LTE/LTE-A systems.

FIG. 4 illustrates a structure of a DL subframe used in 3GPP LTE/LTE-A system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PCFICH carries a HARQ (Hybrid Automatic Repeat Request) ACK/NACK (acknowledgment/negative-acknowledgment) signal in response to UL transmission.

The control information transmitted through the PDCCH will be referred to as downlink control information (DCI). The DCI includes resource allocation information for a UE or UE group and other control information. For example, the DCI includes transmit format and resource allocation information of a downlink shared channel (DL-SCH), transmit format and resource allocation information of an uplink shared channel (UL-SCH), paging information of a paging channel (PCH), system information on a DL-SCH, resource allocation information of a upper layer control message such as a random access response transmitted on PDSCH, a transmit power control command for individual UEs belonging to a UE group, a transmit power control command, activation indication information of VoIP (Voice over IP), a DAI (downlink assignment index), and the like. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

In general, a DCI format capable of being transmitted to a UE varies depending on a transmission mode (TM) set to the UE. In other word, if a UE is configured by a specific transmission mode, it may be able to use a prescribed DCI format(s) corresponding to the specific transmission mode only rather than all DCI formats.

A PDCCH is formed by aggregating one or more consecutive Control Channel Elements (CCEs). A CCE is a logical allocation unit used to provide a PDCCH at a coding rate based on the state of a radio channel. A CCE corresponds to a plurality of resource element groups (REGs). For example, one CCE corresponds to 9 REGs and one REG corresponds to 4 REs. 3GPP LTE defines a CCE set where PDCCH is able to be positioned for each of the user equipments. The CCE set for which a user equipment is able to search its own PDCCH is called a PDCCH search space, simply a search space (SS). An individual resource to which PDCCH is able to be transmitted thereto within the SS is called a PDCCH candidate. A set of PDCCH candidates to be monitored by a UE is defined as a search space. In 3GPP LTE/LTE-A system, a search space for each DCI format may have a different size and a dedicated search space and a common search space are separately defined. The dedicated search space corresponds to a UE-specific search space and may be individually set for each of user equipments. The common search space is configured for a plurality of UEs. Aggregation levels for defining the search space are shown in the following.

TABLE 3

| | Search Space $S_K^{(L)}$ | | |
|---|---|---|---|
| Type | Aggregation Level L | Size[in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits actual PDCCH (DCI) in a random PDCCH candidate belonging to a search space and a UE monitors the search space to find out PDCCH (DCI). In this case, the verb 'monitor' means that the UE attempts to decode each of the PDCCH candidates belonging to the search space in accordance with PDCCH formats monitored by the UE. The UE monitors a plurality of PDCCHs and may be able to detect PDCCH of the UE. Basically, since the UE is unable to know a position from which the PDCCH of the UE is transmitted, the UE attempts to decode all PDCCHs of a corresponding DCI format in every subframe until PDCCH including an identifier of the UE is detected. This process is referred to as blind detection (blind decoding (BD)).

An eNB can transmit data for a UE or a UE group via a data region. The data transmitted via the data region is referred to as a user data. In order to transmit the user data, PDSCH (physical downlink shared channel) can be assigned to the data region. PCH (paging channel) and DL-SCH (downlink-shared channel) are transmitted via the PDSCH. A UE decodes control information transmitted on the PDCCH to read the data transmitted via the PDSCH. Information indicating a UE or a UE group to which the data of the PDSCH is transmitted and information indicating a method for the UE or the UE group to receive and decode the PDSCH data are transmitted in a manner of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific DL subframe. In this case, a UE monitors a PDCCH using its own RNTI information, and if one or more UEs having "A" RNTI are present, the UEs receive the PDCCH and receive the PDSCH indicated by "B" and "C" through the information about the received PDCCH.

In order for a UE to demodulate a signal received from an eNB, it is necessary to have a reference signal (RS) to be compared with a data signal. The reference signal corresponds to a signal of a predetermined specific waveform transmitted to the UE by the eNB or to the eNB by the UE and is referred to as a pilot signal as well. Reference signals are classified into a cell-specific RS commonly used by all UEs in a cell and a demodulation RS (DM RS) dedicated to a specific UE. A DM RS transmitted by an eNB to demodulate downlink data of a specific UE is referred to as a UE-specific RS. In DL, it may transmit a DM RS and a CRS together or transmit either the DM RS or the CRS only. In this case, if the DM RS is transmitted only in DL without the CRS, since the DM RS, which is transmitted by applying the same precoder with data, is used for demodulation purpose only, it is necessary to separately provide an RS for measuring a channel. For example, in 3GPP LTE (-A), an additional RS for measuring a channel, i.e., a CSI-RS, is transmitted to a UE to make the UE measure channel state information. Unlike a CRS transmitted in every subframe, the CSI-RS is transmitted with a prescribed transmission period consisting of a plurality of subframes based on a fact that a channel state is not considerably changed over time.

Figure 5:
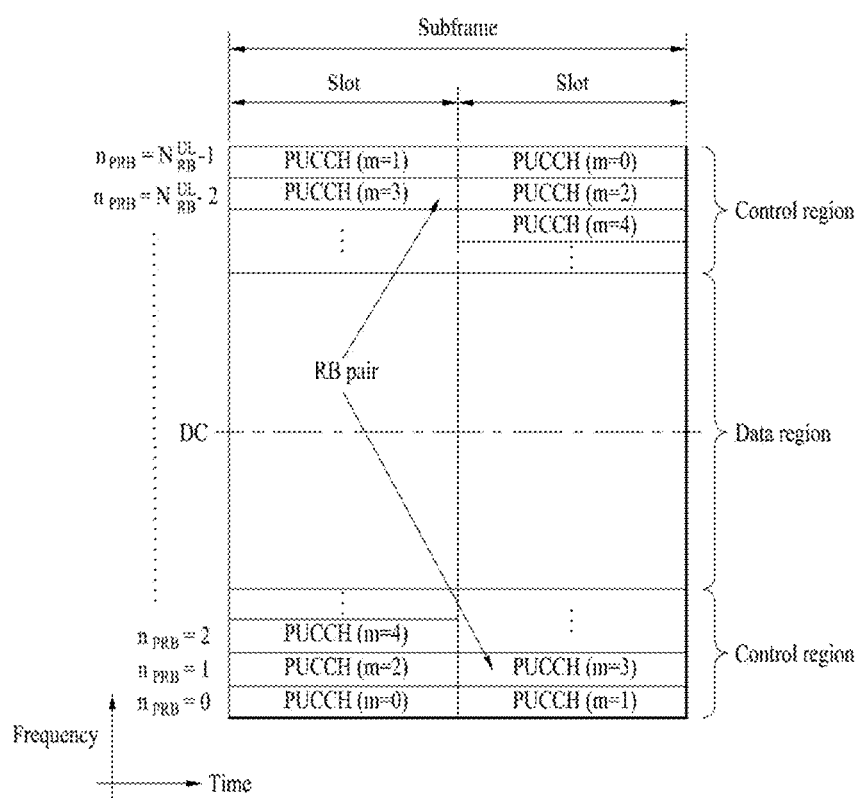
FIG. 5 illustrates a structure of an uplink (UL) subframe used in 3GPP LTE/LTE-A systems.

FIG. 5 is a diagram for an example of an uplink (UL) subframe structure used in 3GPP LTE/LTE-A system.

Referring to FIG. 5, an UL subframe can be divided into a control region and a data region in frequency domain. At least one PUCCH (physical uplink control channel) can be assigned to the control region to transmit uplink control information (hereinafter abbreviated UCI). At least one PUSCH (physical uplink shared channel) can be assigned to the data region to transmit user data.

In an UL subframe, subcarriers far from a DC (direct current) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency $f_0$ in a frequency up converting process. PUCCH for one UE is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for PDCCH and/or a DL data packet (e.g., codeword) on PDSCH. This information indicates whether or not PDCCH or PDSCH is successfully received. HARQ-ACK 1 bit is transmitted in response to a single DL codeword. HARQ-ACK 2 bits are transmitted in response to two DL codewords. HARQ-ACK response includes a positive ACK (simple, ACK), a negative ACK (hereinafter, NACK), DTX (discontinuous transmission), or NACK/DTX. In this case, the term HARQ-ACK is used in a manner of being mixed with HARQ ACK/NACK, ACK/NACK.

CSI (channel state information): Feedback information on a DL channel. MIMO (multiple input multiple output)-related feedback information includes an RI (rank indicator) and a PMI (precoding matrix indicator).

An amount of control information (UCI) capable of being transmitted by a UE in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, the last SC-FDMA symbol of the subframe is also excluded. A reference signal is used for coherent detection of PUCCH. PUCCH supports various formats depending on transmitted information.

Table 4 in the following shows a mapping relation between a PUCCH format and UCI in LTE/LTE-A system.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or R + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, a PUCCH format 1 is mainly used for transmitting ACK/NACK and a PUCCH format 2 is mainly used for transmitting channel state information (CSI) such as CQI/PMI/RI, and a PUCCH format 3 is mainly used for transmitting ACK/NACK information.

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

[LTE Positioning Protocol]

In LTE system, LPP (LTE positioning protocol) is defined to support the OTDOA scheme. According to the LPP, OTDOA-ProvideAssistanceData having a configuration described in the following is transmitted to a UE as an IE (information element).

TABLE 5

```
ASN1START
OTDOA-ProvideAssistanceData ::= SEQUENCE {
   otdoa-ReferenceCellInfo        OTDOA-ReferenceCellInfo
          OPTIONAL,      -- Need ON
   otdoa-NeighbourCellInfo        OTDOA-
NeighborCellInfoList
          OPTIONAL,      -- Need ON
   otdoa-Error
          OTDOA-Error
             OPTIONAL,
       Need ON
   ...
}
-- ASN1STOP
```

In this case, OTDOA-ReferenceCellInfo corresponds to a reference cell for measuring RSTD and can be configured as follows.

TABLE 6

```
ASN1START
   OTDOA-ReferenceCellInfo ::= SEQUENCE {
      physCellId           INTEGER (0..503),
      cellGlobalId         ECGI
      OPTIONAL,            -- Need ON
      earfcnRef                 ARFCN-ValueEUTRA
      OPTIONAL,            -- Cond NotSameAsServ0
      antennaPortConfig         ENUMERATED {ports1-or-2,
      ports4, ... }
      OPTIONAL,            -- Cond NotSameAsServ1
      cpLength                  ENUMERATED { normal,
      extended, ... },
      prsInfo                   PRS-Info
      OPTIONAL,            -- Cond PRS...,
      [[ earfcnRef-v9a0          ARFCN-ValueEUTRA-v9a0
      OPTIONAL             -- Cond NotSameAsServ2]]
      }
-- ASN1STOP
```

In this case, conditional presences are shown in the following.

TABLE 7

| Conditional presence | description |
|---|---|
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfenRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Each individual field of the OTDOA-ReferenceCellInfo is described in the following.

TABLE 8

OTDOA-ReferenceCellInfo field description
physCellId
This field specifies the physical cell identity of the assistance data reference cell.
cellGlobalId
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the assistance data reference cell PRS if the prsInfo field is present, otherwise this field specifies the cyclic prefix length of the assistance data reference cell CRS.
prsInfo
This field specifies the PRS configuration of the assistance data reference cell.

Meanwhile, OTDOA-NeighbourCellInfo corresponds to cells (e.g., an eNB or a TP) becoming a target of RSTD measurement and can include information on maximum 24 neighbor cells according to each frequency layer for maximum 3 frequency layers. In particular, it may be able to inform a UE of information on 72 (3*24) cells in total.

TABLE 9

ASN1START
OTDOA-NeighbourCellInfoList ::= SEQUENCE
(SIZE (1..maxFreqLayers))
OF OTDOA-NeighbourFreqInfo
OTDOA-NeighbourFreqInfo ::= SEQUENCE
(SIZE (1.. 24)) OF OTDOA-
NeighbourCellInfoElement
OTDOA-NeighborCellInfoElement ::= SEQUENCE {
physCellI                               INTEGER
(0.. 503),
CellGlobalID                                ECGI
OPTIONAL,            -- Need ON
earfcn                                  ARFCN-
alueEUTRA OPTIONAL,      -- Cond NotSameAsRef0
cpLength                                ENUMERATED
 {normal, extended, ...}
OPTIONAL,            -- Cond NotSameAsRef1
rsInfo                                   PRS-Info
OPTIONAL,            -- Cond NotSameAsRef2
antennaPortConfig                       ENUMERATED {ports-1-
or-2, ports-4, ...}
OPTIONAL,            -- Cond NotsameAsRef3
slotNumberOffset                        INTEGER (0.. 19)
    OPTIONAL,        -- Cond NotSameAsRef4
prs-SubframeOffset                      INTEGER (0.. 1279)
    OPTIONAL,        -- Cond InterFreq
expectedRSTD                            INTEGER
(0.. 16383),
expectedRSTD-Uncertainty        INTEGER (0.. 1023),
...,
[[ earfcn-v9a0                          ARFCN-ValueEUTRA-v9a0
    OPTIONAL         -- Cond NotSameAsRef5]]
}
maxFreqLayers           INTEGER ::= 3
-- ASN1STOP In this case, conditional presences are shown in the following.

TABLE 10

| Conditional presence | Description |
| --- | --- |
| NotSameAsRef0 | The field is absent if earfcn-v9a0 is present. If earfcn-v9a0 is not present, the field is mandatory present if the EARFCN is not the same as for the assistance data reference cell; otherwise it is not present. |
| NotSameAsRef1 | The field is mandatory present if the cyclic prefix length is not the same as for the assistance data reference cell; otherwise it is not present. |
| NotSameAsRef2 | The field is mandatory present if the PRS configuration is not the same as for the assistance data reference cell; otherwise it is not present. |
| NotSameAsRef3 | The field is mandatory present if the antenna port configuration is not the same as for the assistance data reference cell; otherwise it is not present. |
| NotSameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

Each individual field of the OTDOA-NeighbourCellInfoList is described in the following.

TABLE 11

OTDOA-NeighbourCellInfoList field description
physCellId
This field specifies the physical cell identity of the assistance data reference cell.
cellGlobalId
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the neigbour cell PRS if PRS are present in this neighbour cell, otherwise this field specifies the cyclic prefix length of CRS in this neighbour cell.
prsInfo
This field specifies the PRS configuration of the neighbour cell.
When the EARFCN of the neighbour cell is the same as for the assistance data reference cell, the target device may assume that each PRS positioning occasion in the neighbour cell at least partially overlaps with a PRS positioning occasion in the assistance data reference cell where the maximum offset between the transmitted PRS positioning occasions may be assumed to not exceed half a subframe.
When the EARFCN of the neighbour cell is the same as for the assistance data reference cell, the target device may assume that this cell has the same PRS periodicity (Tprs) as the assistance data reference cell.

In this case, PRS-Info corresponding to an IE, which is included in the OTDOA-ReferenceCellInfo and the OTDOA-NeighbourCellInfo, includes PRS information. Specifically, the PRS-Info is configured as follows while including PRS Bandwidth, PRS Configuration Index (IPRS), Number of Consecutive Downlink Subframes, and PRS Muting Information.

TABLE 12

```
PRS-Info ::= SEQUENCE {
    prs-Bandwidth              ENUMERATED { n6, n15, n25,
    n50, n75, n100, ... },
    prs-ConfigurationIndex     INTEGER (0..4095),
    numDL-Frames               ENUMERATED {sf-1, sf-2, sf-4,
    sf-6, ...},
    ...,
    prs-MutingInfo-r9          CHOICE {
                               po2-r9              BIT
                               string (size(2)),
                               po2-r9              BIT
                               string (size(4)),
                               po2-r9              BIT
                               string (size(8)),
                               po2-r9              BIT
                               string (size(16)),
                               ...
    }
                               OPTIONAL            -- Need OP
}-- ASN1STOP
```

Figure 6:
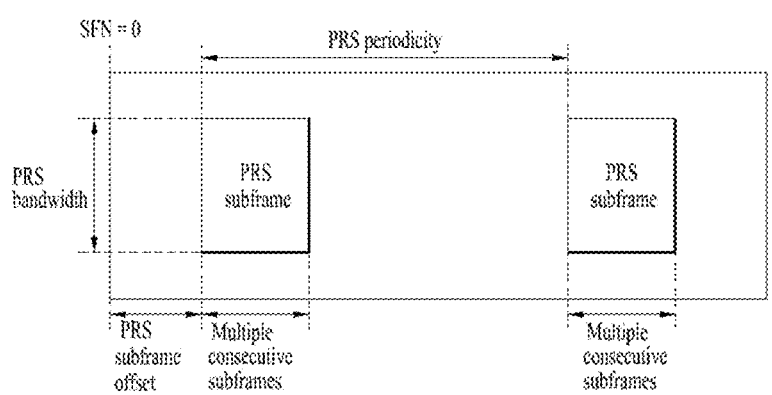
FIG. 6 illustrates a structure for transmitting a positioning reference signal (PRS).

FIG. 6 is a diagram for a PRS transmission structure according to the parameters.

In this case, PRS periodicity and PRS subframe offset are determined according to a value of PRS configuration index (IPRS) and a corresponding relation is shown in the following table.

TABLE 13

| PRS Configuration Index($I_{PRS}$) | PRS Periodicity(subframes) | PRS Subframe Offset(subframes) |
|---|---|---|
| 0-159 | 160 | $I_{PRS}$ |
| 160-479 | 320 | $I_{PRS} - 160$ |
| 480-1119 | 640 | $I_{PRS} - 180$ |
| 1120-23399 | 1280 | $I_{PRS} - 1120$ |

[PRS (Positioning Reference Signal)]

A PRS has a transmission occasion, that is, a positioning occasion at an interval of 160, 320, 640, or 1280 ms, and it may be transmitted in N consecutive DL subframes at the positioning occasion where N may be 1, 2, 4, or 6. Although the PRS may be substantially transmitted at the positioning occasion, it may be muted for inter-cell interference control cooperation. Information on PRS muting is signaled to a UE through prs-MutingInfo. Unlike a system bandwidth of a serving eNB, a PRS transmission bandwidth may be independently configured and the PRS is transmitted in a frequency bandwidth of 6, 15, 25, 50, 75, or 100 resource blocks (RBs). A transmission sequence for the PRS is generated by initializing a pseudo-random sequence generator for every OFDM symbol using a function of a slot index, an OFDM symbol index, a cyclic prefix (CP) type, and a cell ID. The generated transmission sequences for the PRS can be differently mapped to resource elements (REs) based on whether a normal CP or extended CP is used. A position of the mapped RE may be shifted on the frequency axis, and in this case, a shift value is determined by a cell ID.

For PRS measurement, a UE receives configuration information on a list of PRSs that the UE should search for from a positioning server of the network. The corresponding information includes PRS configuration information of a reference cell and PRS configuration information of neighboring cells. Configuration information for each PRS includes a generation period of the positioning occasion and offset thereof, the number of consecutive DL subframes included in one positioning occasion, a cell ID used in generating a PRS sequence, a CP type, the number of CRS antenna ports considered in PRS mapping, etc. In addition, the PRS configuration information of neighboring cells includes slot offsets and subframe offsets of the neighbor cells and reference cell, expected RSTD, and a degree of uncertainty of the expected RSTD. Thus, the PRS configuration information of neighboring cells supports the UE to determine when and which time window the UE should search for corresponding PRSs to detect PRSs transmitted from the neighboring cells.

The reference signal time difference (RSTD) may refer to a relative timing difference between an adjacent (or neighboring) cell j and a reference cell i. In other words, the RSTD may be expressed by $T_{subframeRxj} - T_{subframeRxi}$. $T_{subframeRxj}$ denotes a time at which a UE starts to receive a specific subframe from the neighboring cell j.

$T_{subframeRxi}$ denotes to a time at which the UE starts to receive from the reference cell i a subframe closest in time to the specific subframe, which is received from the neighboring cell j. The reference point for an observed subframe time difference is an antenna connector of the UE.

Hereinafter, PRS transmission methods using beamforming will be described based on the positioning information acquisition methods.

Figure 7:
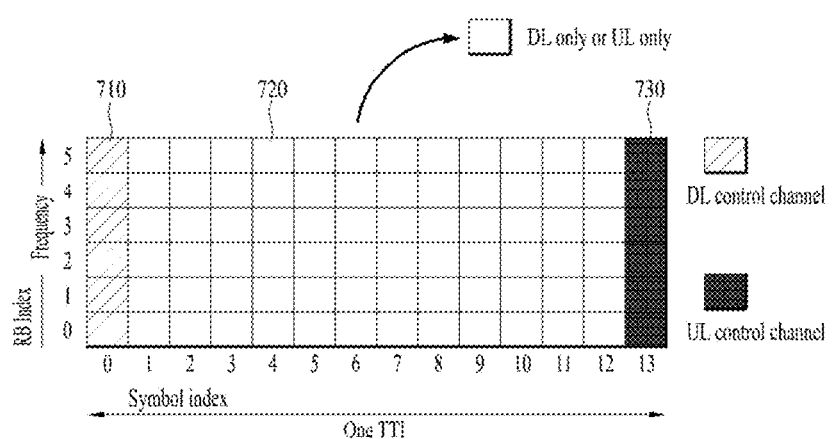
FIG. 7 illustrates a method of transmitting data and control information based on a time division multiplexing (TDM) structure.

To minimize latency for a UE operating in the new RAT, a structure in which control and data channels are time division multiplexed (TDMed) as shown in FIG. 7 may be considered as one frame structure. In time division multiplexing (TDM), information may be configured on a symbol basis based on time sharing. In FIG. 7, a hatched area 710 represents a DL control region, and a black area 730 represents a UL control region. An empty area 720 may be used for DL data transmission or UL data transmission.

In the structure shown in FIG. 7, DL transmission and UL transmission are sequentially performed in one subframe. For example, DL data transmission and UL ACK/NACK reception may be performed in one subframe. Consequently, when a data transmission error occurs, it is possible to reduce a time required until data is retransmitted, thereby minimizing the latency of the overall data transmission.

In the above TDM-based frame structure, a time gap is required to allow a BS and a UE to switch from transmission mode to reception mode and vice versa, and to this end, some OFDM symbols at the time of DL-to-UL switching are set as a guard period (GP).

Figure 8:
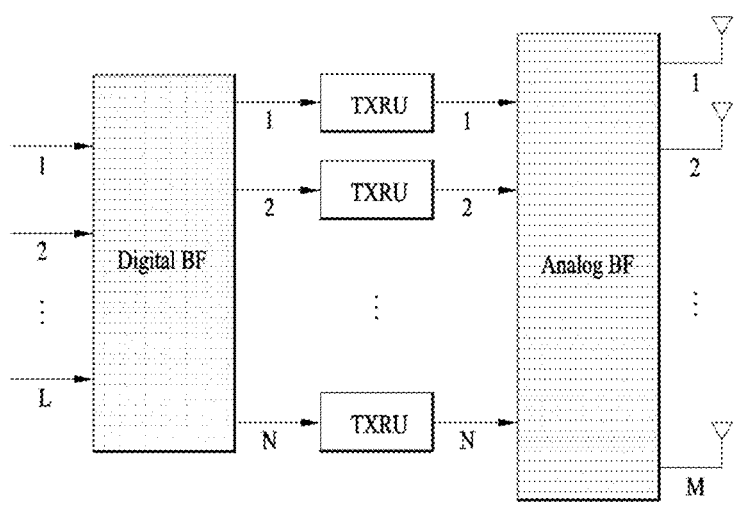
FIG. 8 illustrates a hybrid beamforming structure.

FIG. 8 is a diagram for explaining a method of configuring digital beamforming and analog beamforming.

A method of improving accuracy in a small area, for example, an indoor environment has been discussed in the new RAT. A high frequency band, i.e., millimeter wave (mmWave) band may be used for communication in a small area.

In the mmW system, since a wavelength is shortened, a plurality of antenna elements may be installed in the same unit area. That is, since the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW system, coverage or throughput may be improved by increasing the beamforming (BF) gain using multiple antenna elements.

In this case, if each antenna element has a transceiver unit (TXRU) so that adjustment of transmission power and phases is enabled per antenna element, independent BF may be performed on each frequency resource. However, installing TXRUs in all of the about 100 antenna elements is less feasible in terms of cost. Therefore, a method of mapping a plurality of antenna elements to one TXRU and adjusting the direction of a beam using an analog phase shifter is considered. However, in this analog BF method, it is difficult to perform frequency-selective BF because only one beam direction is generated over the full band.

To solve this problem, as an intermediate form of digital BF and analog BF, hybrid BF with B TXRUs fewer than Q antenna elements may be considered.

In this case, the number of beam directions that can be transmitted at the same time may be limited to B or less, which depends on how B TXRUs and Q antenna elements are connected.

Referring to FIG. 8, the analog BF (or radio frequency BF) may mean that precoding or combining is performed at the RF stage.

In the hybrid BF, precoding (or combining) is performed at the baseband stage and the RF stage, and therefore the number of RF chains and the number of digital-to-analog (D/A) (or A/D) converters may be reduced, while achieving performance close to that of the digital BF.

In FIG. 8, the hybrid BF is represented by N TXRUs and M physical antennas. In this case, digital BF for L data layers to be transmitted by the transmission end may be represented by an N by L matrix, and the N converted digital signals obtained thereafter may be converted into analog signals via the TXRUs and then subjected to analog beamforming, which is represented by an M by N matrix. Then, N converted digital signals are converted into analog signals by the TXRUs, and then analog BF, which is represented by an M by N matrix, is applied to the converted signals.

In FIG. 8, it is assumed that the number of digital beams is L and the number of analog beams is N. In the new RAT system, a BS may be designed such that it is capable of changing analog BF on a symbol basis so that efficient BF may be provided to UEs located in a specific area. In addition, a method of introducing a plurality of antenna panels to which independent hybrid BF is applicable by defining N TXRUs and M RF antennas as one antenna panel is also considered in the new RAT system. However, the present disclosure is not limited thereto.

Figure 9:
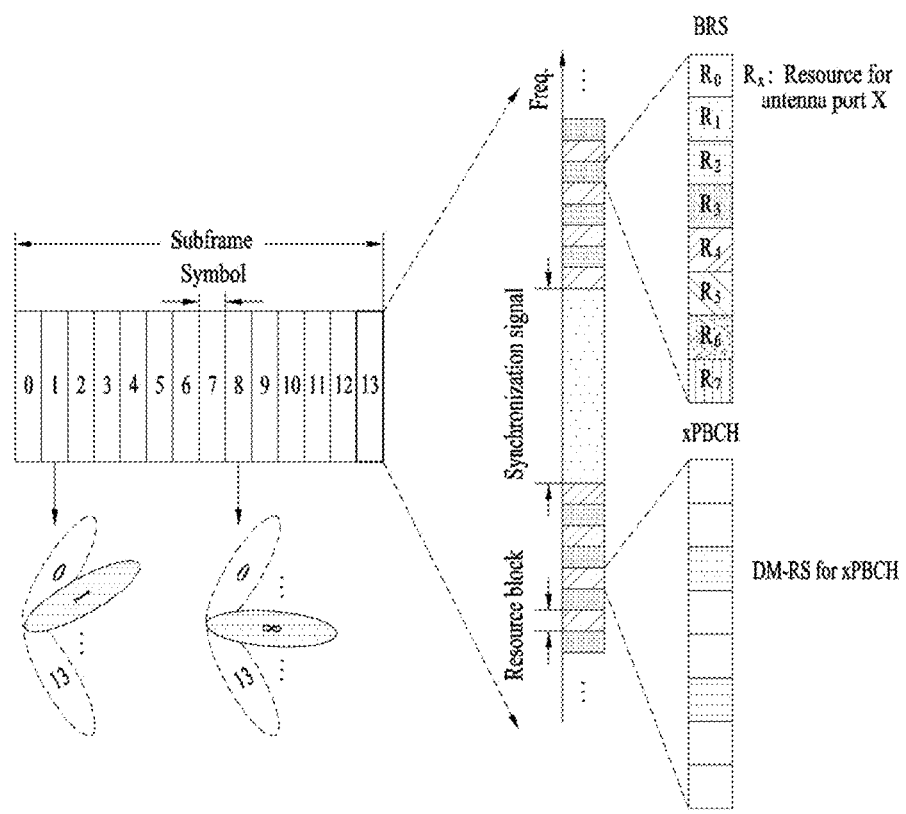
FIG. 9 illustrates a signal transmission method based on beam sweeping.

FIG. 9 is a diagram illustrating a method of performing beam sweeping on a symbol basis.

When a BS uses a plurality of analog beams as described above, each UE may have a different analog beam suitable for signal reception. Thus, for synchronization signals, system information, paging, etc., the BS may change a plurality of analog beams per symbol in a specific subframe. That is, the beam sweeping operation may allow all UEs to have opportunities for receiving the above information.

Referring to FIG. 9, the beam sweeping operation may be performed for synchronization signals and system information in DL transmission.

In this case, the synchronization signal and system information may be broadcasted. A physical resource (or a physical channel) for transmitting system information may be referred to as a physical broadcast channel (xPBCH). However, the present disclosure is not limited thereto.

Analog beams belonging to different antenna panels may be simultaneously transmitted in one symbol. In other words, different analog beams corresponding to a specific antenna panel may be transmitted at the same time. Thus, a beam reference signal (BRS) corresponding to a reference signal (RS) applied to a specific antenna panel (or a specific analog beam) may be applied as shown in FIG. 9.

The BRS may be defined for a plurality of antenna ports, and each BRS antenna port may correspond to a single analog beam. In this case, in contrast to the BRS, all analog beams in an analog beam group may be used in broadcasting a synchronization signal or xPBCH to assist a random UE to correctly receive the synchronization signal or xPBCH.

As described above, the analog BF may be applied to the new RAT (NR) system. For example, a system may be designed by considering the analog BF not only in mmWave bands but also in bands below 6 GHz. In addition, either single BF or multiple BF may be applied depending on BS capability.

Herein, the single BF means that the analog BF is performed in one direction within one symbol, and the multiple BF means that the analog BF is performed in multiple directions within one symbol.

When many antennas are used for BF, a beam width may become narrow. Thus, accurate positioning may be achieved. Beam reciprocity, i.e., using the same beam for transmission and reception may be considered. The beam reciprocity may be particularly efficient in TDD bands. In addition, multiple beams may be used to cover DL coverage.

In the NR system, there are many requirements for positioning. As a result, the PRS transmission method may be modified, and details thereof will be described later.

Figure 10:
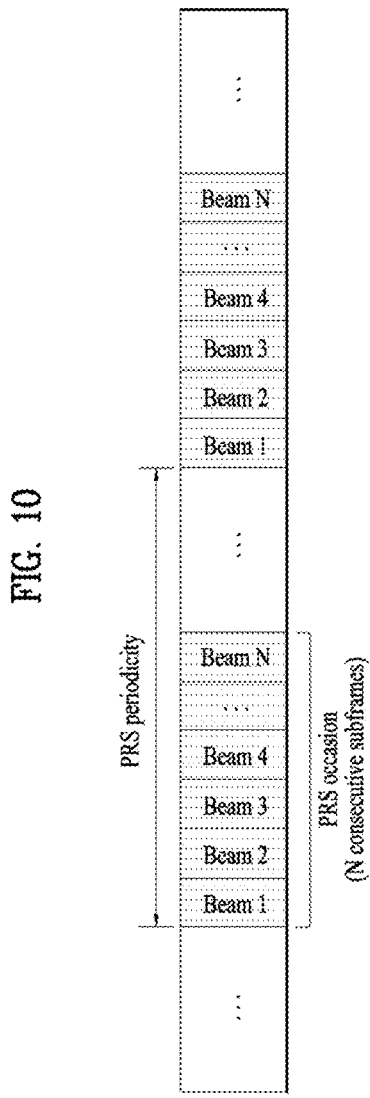
FIG. 10 illustrates a method of transmitting a PRS on a PRS occasion.

FIG. 10 illustrates a PRS transmission method based on a PRS occasion.

As described above, a BS may transmit a PRS to a UE by considering RSTD and measure the location thereof using an OTDOA-based positioning scheme. The accuracy of the OTDOA scheme may be improved as the bandwidth increases. Thus, the PRS may be allocated and transmitted over a large frequency region. Referring to FIG. 10, when BF is applied to positioning, the BS may transmit the PRS by changing a beam on a subframe basis on the PRS occasion in the following order: beam 1, beam 2, . . . , beam N. However, in this case, PRS overhead may increase as the value of N increases, and as a result, the spectral efficiency of the system may decrease. In other words, when the number of beams of the BS increases, the PRS overhead may increase, and the spectral efficiency of the system may decrease. To solve this problem, the present disclosure describes a method of configuring beams on a PRS occasion and a method for decreasing PRB overhead while achieving high accuracy of positioning using multiplexing. The PRS occasion may refer to a period in which the PRS is transmitted, and the PRS may be transmitted with a predetermined periodicity based on the PRS occasion. However, the present disclosure is not limited thereto.

Figure 11:
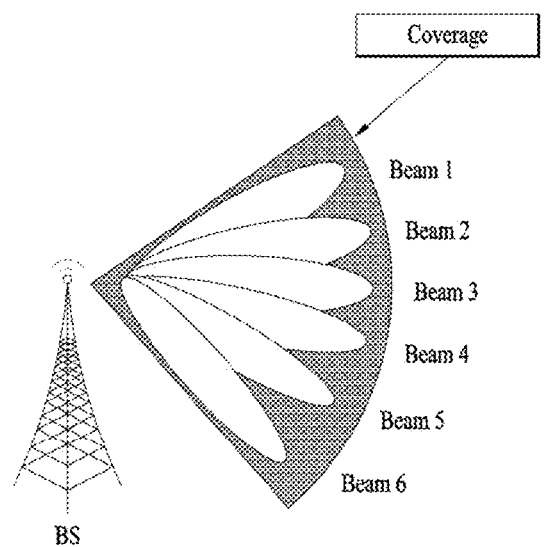
FIG. 11 illustrates a signal transmission method based on beam sweeping.
Figure 12:
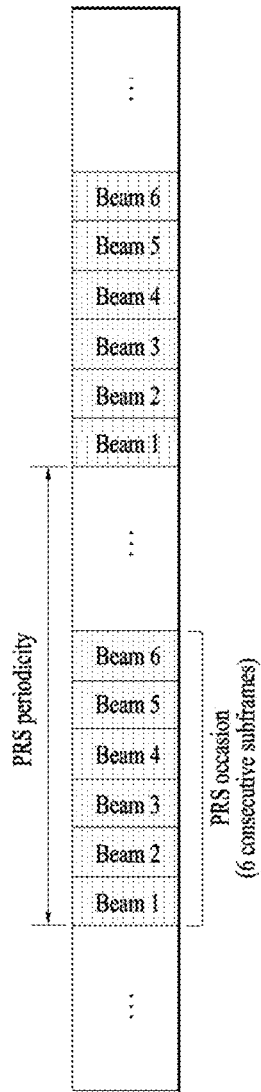
FIG. 12 illustrates a method of transmitting a PRS on a PRS occasion.

FIGS. 11 and 12 are diagrams illustrating PRS transmission methods based on beam sweeping.

Referring to FIG. 11, a BS may transmit a plurality of beams. In this case, the coverage of a cell may be determined based on the plurality of beams transmitted by the BS. In FIG. 11, the coverage may be configured by, for example, beams 1 to 6. In this case, the BS may perform PRS transmission by sweeping beams 1 to 6.

In FIG. 11, when the BS transmits a PRS for a beam on a PRS occasion, the BS may transmit the PRS for the beam in each subframe on the PRS occasion as described above.

When the number of beams increases, the number of PRSs transmitted on the PRS occasion may also increase. However, due to overhead, the number of PRSs transmitted on the PRS occasion needs to be limited. For example, if the number of beams is more than the number of subframes for the PRS transmission on the PRS occasion, all beams may not be swept for the PRS transmission. Thus, when there are multiple beams, the PRS transmission method may need to be modified.

For example, if a UE remains at rest or moves at a low speed, the UE may not need to perform positioning measurement by receiving the PRS on each PRS occasion. That is, when remaining at rest or moving at a low speed, the UE may not perform the positioning measurement in order to reduce overhead or power consumption.

Accordingly, the BS may transmit the PRS by sweeping some predetermined beams rather than all beams on multiple PRS occasions. Specifically, the BS may provide information on beams used on each PRS occasion to the UE. For example, the BS may transmit the information on the beams used on each PRS occasion in various ways including RRC signaling. However, the present disclosure is not limited thereto.

After providing the UE with the information on the beams used on each PRS occasion, the BS may transmit the PRS by changing the beams based thereon.

Figure 13:
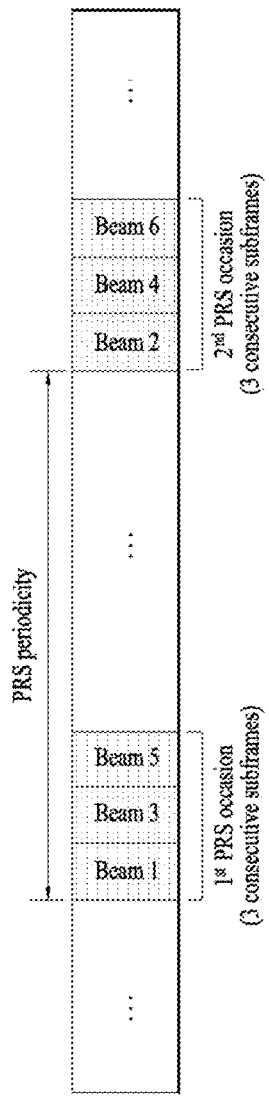
FIG. 13 illustrates a method of transmitting a PRS on a PRS occasion.

For example, referring to FIG. 13, there may be three consecutive PRS subframes on a PRS occasion. For PRS transmission, a set of beam 1, beam 3, and beam 5 (set 1) may be swept on a first PRS occasion, and a set of beam 2, beam 4, and beam 6 (set 2) may be swept on a second PRS occasion. In other words, the BS may transmit a predetermined beam set on each PRS occasion to efficiently transmit PRSs for all beams even when there are many beams.

In FIG. 13, since the PRSs for all beams are transmitted over two occasions, the UE may receive the PRS at least once every two PRS occasions. If the UE is capable of receiving a beam in set 1 and a beam in set 2, the UE may receive the RPS on each PRS occasion. In addition, information on a beam used for each subframe on the PRS occasion may be provided to the UE through physical layer signaling or higher layer signaling.

To allow all UEs in cell coverage to receive the PRS on each PRS occasion, the BS may transmit the PRS by dividing time/frequency resources for each beam and performing beamforming.

However, there may be a limitation in dividing the time/frequency resources, and as a result, sufficiently high accuracy of positioning may not be provided. Thus, in the case of a UE that requires high accuracy of positioning, the UE may need to be provided with a separate PRS.

Figure 14:
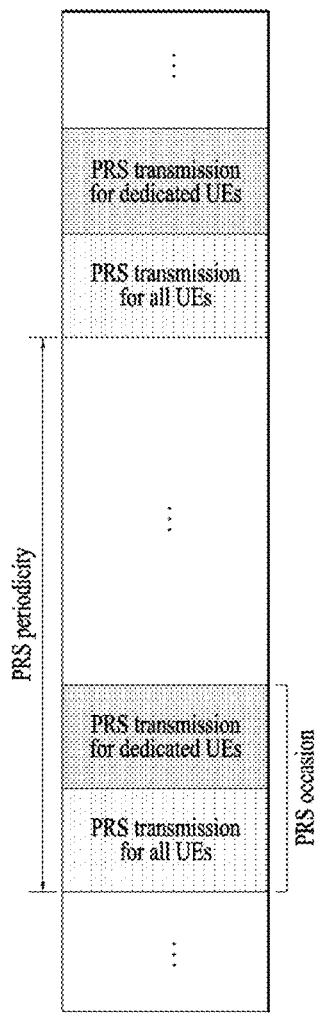
FIG. 14 illustrates a method of transmitting a PRS for all user equipments (UEs) and a UE-dedicated PRS.

Referring to FIG. 14, resources on a PRS occasion may be divided. Specifically, some resources may be used to allocate a PRS for all in-coverage UEs, and other resources may be used to transmit a UE-dedicated PRS via BF for UEs that requires high accuracy of positioning. In other words, both a PRS for all UEs and a UE-dedicated PRS based on BF for a specific UE may be configured and transmitted.

Figure 15:
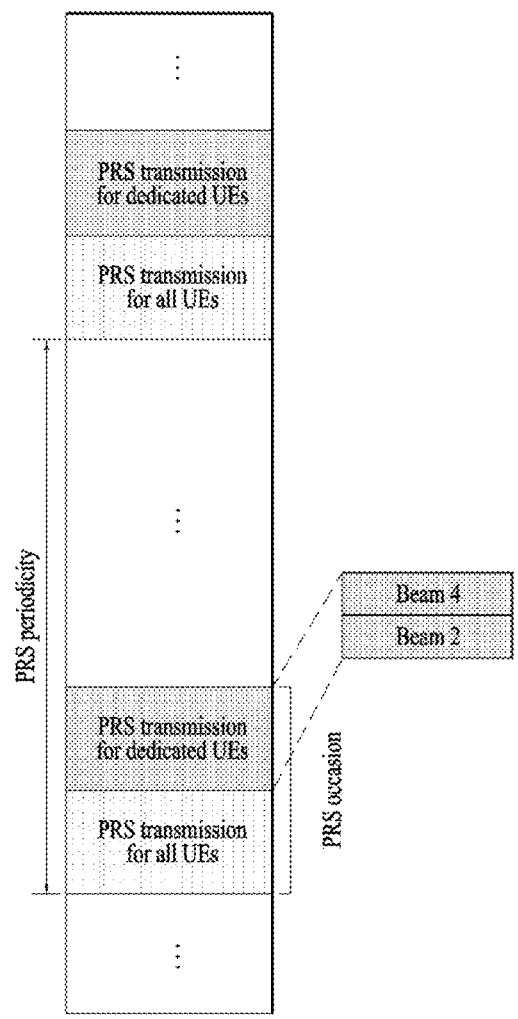
FIG. 15 illustrates a method of transmitting a PRS for all UEs and a UE-dedicated PRS.

FIG. 15 shows a particular embodiment based on FIG. 14. In FIG. 15, a PRS for all UEs may be allocated to PRS occasions. A UE-dedicated PRS may be configured for a specific UE. In this case, beams 2 and 4 may be used for the UE-dedicated PRS. In other words, specific beam(s) may be used for the UE-dedicated PRS. If UEs are capable of performing PRS reception via beams 2 and 4, the UEs may improve the accuracy of positioning.

In this case, other beams besides beams 2 and 4 may also be used for the UE-dedicated PRS. That is, the present disclosure is not limited thereto.

The beam for transmitting the UE-dedicated PRS may be determined in various ways. Specifically, the UE may measure signal strength from a DL RS. When the signal strength is more than a specific threshold ($\gamma$th), the UE may select a corresponding cell ID and/or beam ID and then inform the network of the selected cell ID and/or beam ID. The threshold ($\gamma$th) may be predetermined and vary for each UE. When the signal strength is smaller than or equal to the threshold ($\gamma$th), the UE may recognize the PRS as noise. That is, the performance of the PRS may be degraded, and as a result, the PRS may be meaningless. Therefore, the UE may select a cell ID and/or beam ID where it is expected that the signal strength is more than the threshold ($\gamma$th) and then inform the network of the selected cell ID and/or beam ID.

The network may obtain cell IDs and/or beam IDs from multiple UEs. When a PRS occasion is configured based on cell IDs and/or beam IDs, beams may be selected such that many users receives PRSs on one occasion.

For example, when a BS has N beams and there are M subframes on a PRS occasion, M PRSs may be selected from among N PRSs and then transmitted. In this case, the number of UEs having received power greater than the threshold ($\gamma$th) may be calculated for each beam. As described above, a beam for a UE having received power greater than the threshold ($\gamma$th) may be first selected in order to provide the PRS to UEs as many as possible. In this case, if the number of UEs satisfying the above condition is the same for each beam, a beam with high power may be selected.

Figure 16:
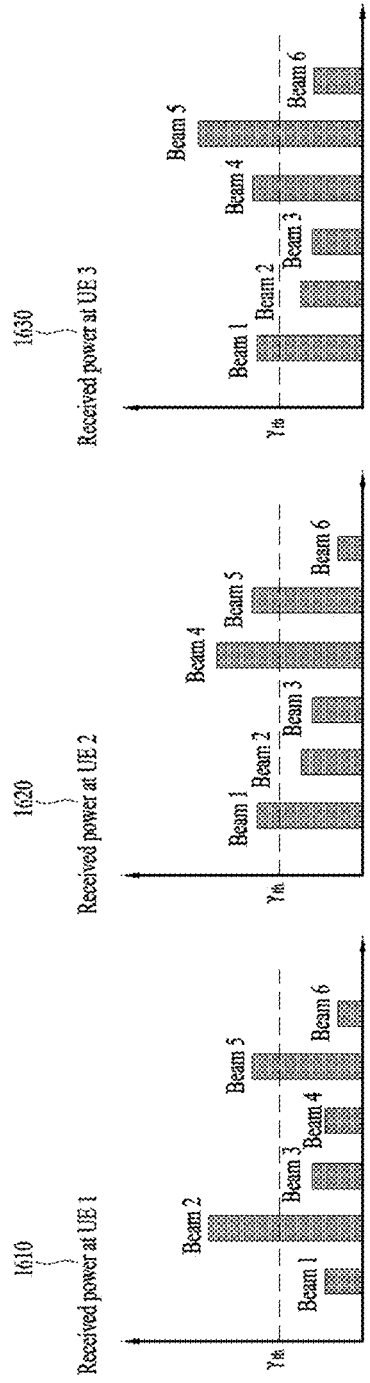
FIG. 16 illustrates a method of selecting a beam based on received power.
Figure 17:
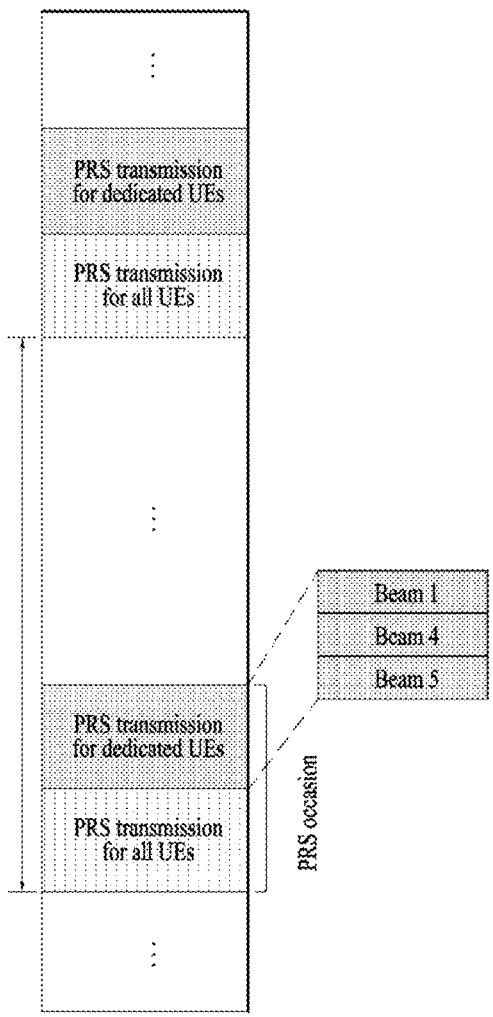
FIG. 17 illustrates a method of transmitting a PRS for all UEs and a UE-dedicated PRS.

Referring to FIGS. 16 and 17, received power may be measured for each beam to select a beam for transmitting a UE-dedicated PRS. Referring to FIG. 16, the measurement of the received power of UE 1 (1610) shows that the received power for each of beams 2 and 5 is greater than the threshold ($\gamma$th). The measurement of the received power of UE 2 (1620) shows that the received power for each of beams 1, 4, and 5 is greater than the threshold ($\gamma$th). The measurement of the received power of UE 3 (1630) shows that the received power for each of beams 1, 4, and 5 is greater than the threshold ($\gamma$th). The above information may be transmitted as multi-pair information to the network. For example, UE 1 (1610) may transmit, as beam information, (cell ID of UE 1, beam 2) and (cell ID of UE 1, beam 5) to the network. UE 2 (1620) may transmit, as beam information, (cell ID of UE 2, beam 1), (cell ID of UE 2, beam 4), and (cell ID of UE 2, beam 5) to the network. UE 3 (1630) may transmit, as beam information, (cell ID of UE 3, beam 1), (cell ID of UE 3, beam 4), and (cell ID of UE 3, beam 5) to the network.

In this case, it may be seen that only the received power for beam 5 is measured to be greater than the threshold ($\gamma$th) at all of UE 1 (1610), UE 2 (1620), and UE 3 (1630). Thus, beam 5 may be selected as the beam for the PRS transmission. In addition, it may be seen that the received power for each of beams 1 and 4 is measured to be greater than the threshold (γth) in both UE 2 (1620) and UE 3 (1630). Although the number of UEs related to beam 1 may be equal to that related to beam 4, the received power for beam 4 is greater than that of beam 1 at UE 2 (1620), and thus, beam 4 may be selected as the second beam for the PRS transmission. Then, beam 1 may be selected as the third beam for the PRS transmission.

The above-described configuration is merely exemplary, and thus, the number of UEs, the number of beams, and the number of PRS subframes on the PRS occasion may vary. In summary, the UE may measure received power for each beam and transmit the measured power to the network, and the network may select the beam for transmitting the UE-dedicated PRS based on the number of UEs having received power greater than the threshold (γth) for each beam. However, the present disclosure is not limited thereto.

When the same beam is used for both a PRS for all UEs (PRS transmission for all UEs) and a UE-dedicated PRS (PRS transmission for dedicated UEs), different resources should be used for the PRS for all UEs and the UE-dedicated PRS. By doing so, more resources may be secured, and thus, accuracy may also be improved.

The UE-dedicated PRS may be aperiodically transmitted. For example, when there is a request from a UE, the UE-dedicated PRS (PRS transmission for dedicated UEs) may be transmitted together with the PRS for all UEs (PRS transmission for all UEs) on the PRS occasion. However, the present disclosure is not limited thereto.

Figure 18:
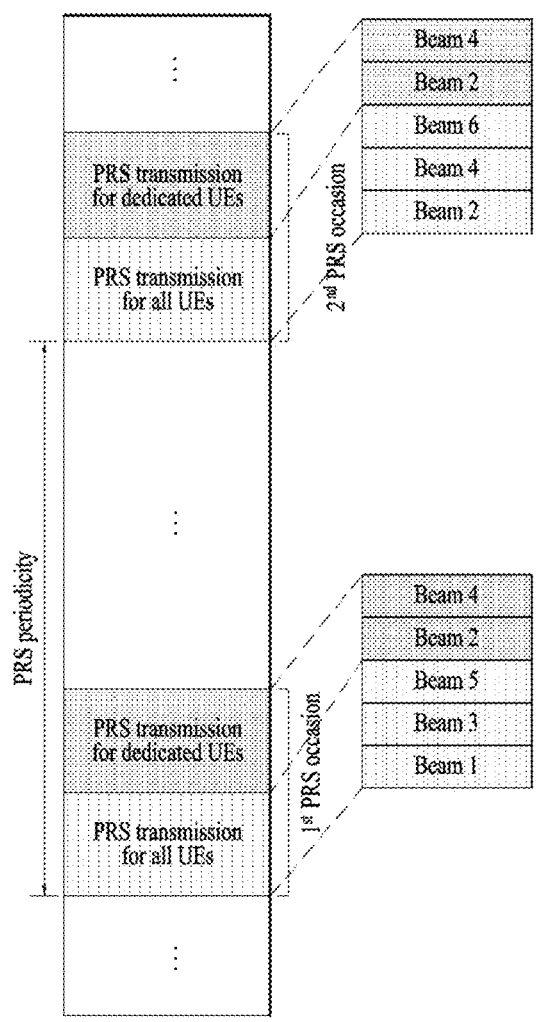
FIG. 18 illustrates a method of transmitting a PRS for all UEs and a UE-dedicated PRS.

FIG. 18 illustrates a method of designing PRS transmission by combining the PRS transmission methods illustrated in FIGS. 13 to 17.

Specifically, a PRS may be transmitted by sweeping predetermined beams in each PRS (PRS transmission for all UEs) region for all UEs on multiple PRS occasions. In this case, an additional PRS may be transmitted in each UE-dedicated PRS (PRS transmission for dedicated UEs) region on the multiple PRS occasions.

Referring to FIG. 18, a BS has beams 1 to 6. That is, the BS may transmit beams 1 to 6. In this case, the BS may transmit a PRS for each beam on multiple PRS occasions as a PRS for all UEs (PRS transmission for all UEs). For example, the BS may transmit PRSs for beams 1, 3, and 5 on the first PRS occasion and transmit PRSs for beams 2, 4, and 6 on the second PRS occasion.

In this case, beams 2 and 4 may be used for a UE-dedicated PRS every PRS occasion. Thus, all users may receive the PRS over two PRS occasions. In addition, dedicated UEs (specific UEs) may receive the PRS on each PRS occasion.

FIG. 18 is merely exemplary. That is, the number of beams or beam allocation may be changed. The PRS for all UEs and the UE-dedicated PRS may be separately configured. At the same time, a PRS for each beam may be transmitted as the PRS for all UEs, and a PRS for a specific beam may be transmitted as the UE-dedicated PRS. However, the present disclosure is not limited thereto.

When PRS transmission is performed by selecting specific beams on a PRS occasion, there may be a UE that fails to receive a PRS.

In FIG. 13, for example, only UEs in coverage of beams 1, 3, and 5 may receive PRSs on the first PRS occasion and then perform the positioning.

In other words, UEs in coverage of beams 2, 4, and 6 wait until the second PRS occasion to receive PRSs and then perform the positioning.

The movement of the UE may cause a problem in PRS reception. For example, before the movement, the UE may be out of coverage corresponding to the beams on the first PRS occasion. When receiving the second PRS occasion after the movement, the UE may be out of coverage corresponding to the beams on the second PRS occasion. That is, due to the movement, the UE may fail to receive all PRSs.

Thus, the BS may use a wide beam capable of covering the entirety of coverage in all PRS subframes. At the same time, the BS may change the widths of narrow beams in each subframe and then transmit the PRS according to the above-described methods. In other words, the BS may transmit the PRS by multiplexing different widths of beams.

Figure 19:
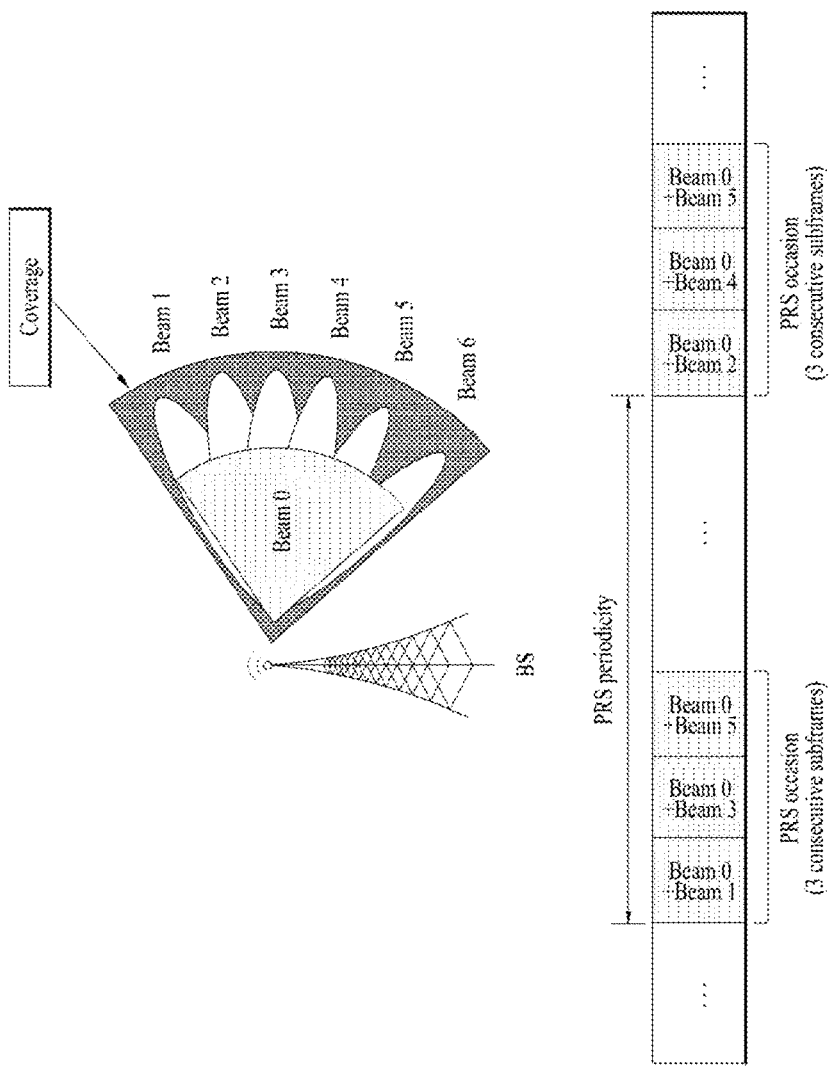
FIG. 19 illustrates a method of transmitting both wide and narrow beams.

Referring to FIG. 19, a BS may transmit beam 0 capable of covering the entirety of coverage in all PRS subframes. At the same time, if there are three subframes in a PRS occasion, the BS may selectively transmit three beams among all beams. Thus, a UE may receive the PRS at all positions in the coverage.

For example, a PRS transmitted on the wide beam for covering the entire coverage may be orthogonal to a PRS transmitted on the narrow beam in each subframe.

As another example, the wide beam for covering the entire coverage may be used to transmit the PRS in the same way as in the legacy LTE, while the PRS transmitted on the narrow beam in each subframe may be transmitted based on frequency shifting. In this case, a parameter or an offset for the frequency shifting may be preconfigured by the network.

As a further example, the PRS transmitted on the wide beam for covering the entire coverage and the PRS transmitted on the narrow beam in each subframe may exist on the same resource. To distinguish between the wide and narrow beams, different PRS sequences may be used when the PRSs are generated.

Different resource configuration methods may be configured for the PRS transmitted on the wide beam and the PRS transmitted on the narrow beam. However, the present disclosure is not limited thereto.

The UE may use both the PRS transmitted on the wide beam for covering the entire coverage and the PRS transmitted on the narrow beam in each subframe. That is, the UE may perform RSTD measurement for OTDOA positioning using all received PRSs. In this case, since all PRSs transmitted on different beams are used for the RSTD measurement, the accuracy may be improved compared to when a PRS transmitted on a single beam is used for the measurement.

Figure 20:
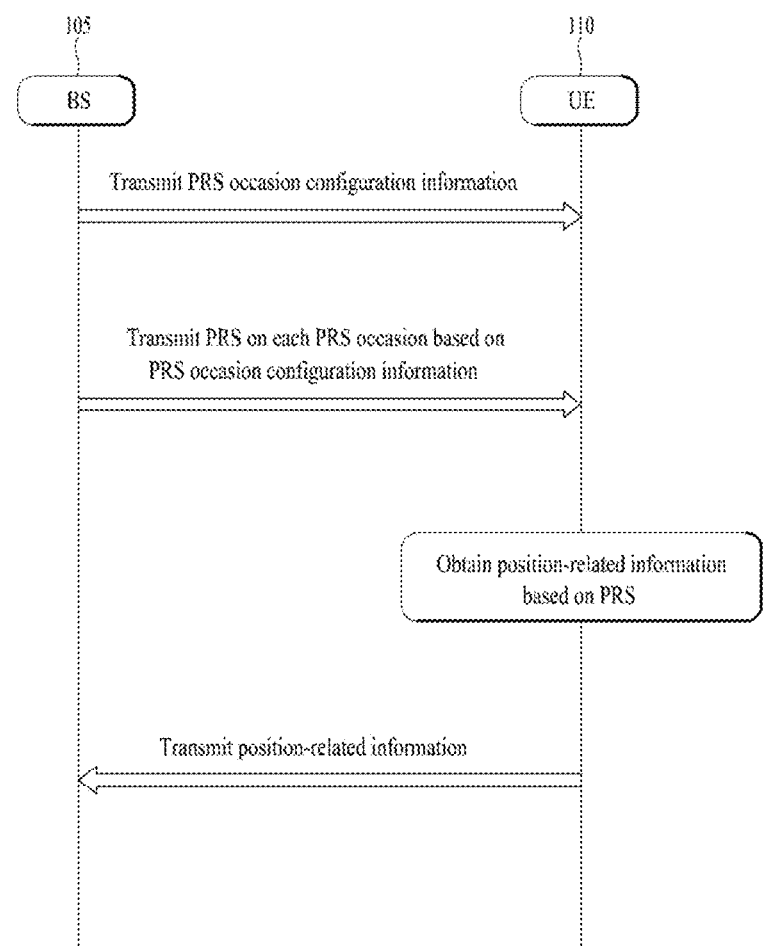
FIG. 20 illustrates a PRS transmission method.

FIG. 20 illustrates a PRS transmission method.

Referring to FIG. 20, a BS 105 may transmit PRS occasion configuration information to a UE 110. For example, the BS 105 may transmit the PRS occasion configuration information to the UE 110 through physical layer signaling or higher layer signaling. The BS 105 may transmit a PRS on each PRS occasion based on the PRS occasion configuration information. The PRS occasion configuration information may include information about beams used on each PRS occasion. In other words, the PRS occasion configuration information may include information about beams used on multiple PRS occasions. The BS 105 may transmit the PRS by sweeping the beams used on each PRS occasion. The UE 110 may obtain position-related information based on the PRS received from the BS 105. To use an OTDOA-based positioning scheme, the UE 110 may measure and obtain an RSTD, which corresponds to a difference between time of arrivals (TOAs) of PRSs transmitted from different BSs. The RSTD may be used as positioning-related information. However, the present disclosure is not limited thereto, and any positioning information may be used. Thereafter, the UE 110 may transmit the positioning-related information obtained from the BS 105.

Figure 21:
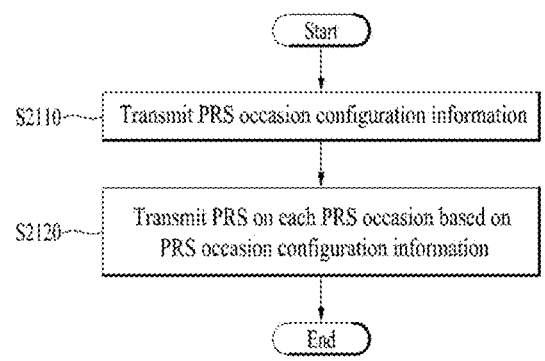
FIG. 21 is a flowchart illustrating a PRS transmission method.

FIG. 21 is a flowchart illustrating a PRS transmission method.

A BS may transmit PRS occasion configuration information to a UE (S2110). As described above with reference to FIGS. 1 to 20, the PRS occasion configuration information may include information on beams used on each PRS occasion.

The BS may transmit a PRS on each PRS occasion based on the PRS occasion configuration information (S2120). As described above with reference to FIGS. 1 to 20, the PRS occasion configuration information may include the information on the beams used on each PRS occasion. The BS may transmit the PRS by sweeping the beams used on each PRS occasion.

For example, each of the beams indicated by the PRS occasion configuration information may be swept and transmitted on a PRS subframe basis in the PRS occasion. That is, one beam may be configured in each PRS subframe for PRS transmission.

As another example, first and second PRSs may be respectively assigned to first and second regions on each PRS occasion and then transmitted therein. In this case, the first PRS may be a PRS for all UEs, and the second PRS may be a UE-dedicated PRS for a specific UE. The BS may transmit the first PRS by sweeping beams in the first region. The beams used in the first region may be indicated by the PRS occasion configuration information. Each beam may be swept on a PRS subframe basis in the first region. If the number of available beams of the BS is greater than the number of PRS subframes in the first region, the beams may be distributed over first regions on multiple PRS occasions. For example, some of the available beams of the BS may be swept in the first region on a first PRS occasion, and the remaining beams, i.e., beams not configured in the first region on the first PRS occasion among the available beams of the BS may be swept in the first region on a second PRS occasion. In doing so, the BS may sweep all available beams on multiple PRS occasions and transmit the PRS on each beam.

As a further example, the second PRS may be transmitted in the second region on the PRS occasion. The second PRS may be transmitted through a specific beam based on beamforming. The specific beam for transmitting the second PRS may be configured equally in the second region on the PRS occasion. That is, the specific beam for transmitting the second PRS may be configured in the second region on every PRS occasion, and the second PRS may be transmitted by sweeping the specific beam. However, the present disclosure is not limited thereto.

Figure 22:
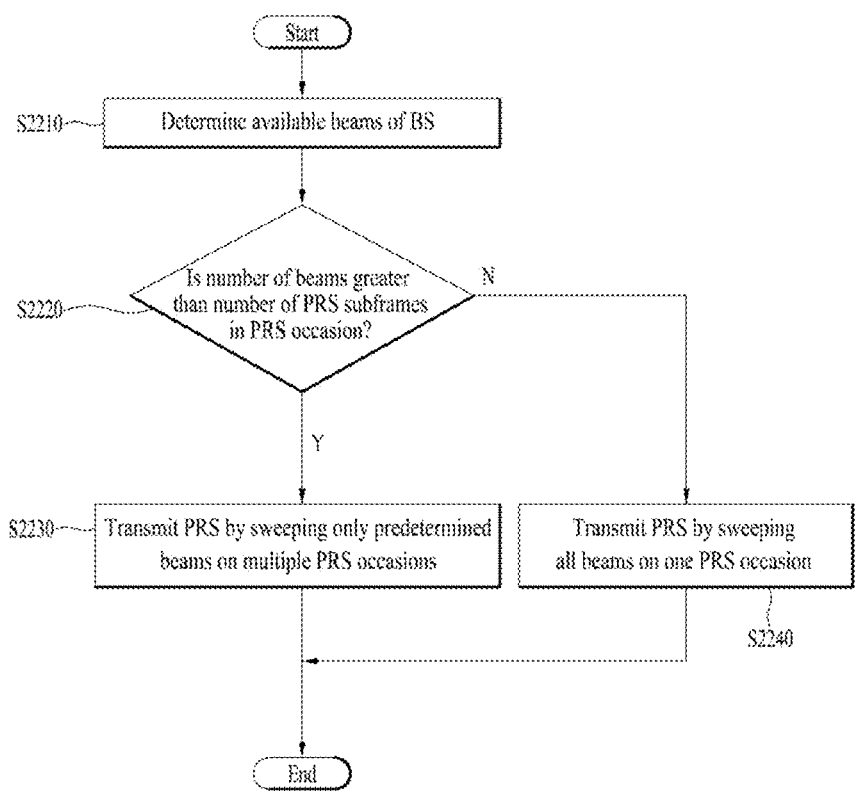
FIG. 22 illustrates a method of transmitting a PRS based on the number of PRS subframes.

FIG. 22 illustrates a method of transmitting a PRS based on the number of PRS subframes.

A BS may determine available beams (S2210). As described above with reference to FIGS. 1 to 21, coverage may be configured based on the available beams of the BS. In other words, the BS may configure the coverage based on the available beams.

The BS may determine beams for transmitting the PRS based on the number of PRS subframes in a PRS occasion. When the number of beams is greater than the number of PRS subframes in the PRS occasion (S2220), the BS may transmit the PRS by sweeping only predetermined beams on multiple PRS occasions (S2230). Specifically, when the number of available beams of the BS is greater than the number of PRS subframe in the PRS occasion, the BS may not sweep all beams on one PRS occasion as described above with reference to FIGS. 1 to 21. In this case, the BS may transmit the PRS by sweeping predetermined beams on multiple PRS occasions. For example, when the BS is capable of using beams 1 to 6 and there are three PRS subframes in the PRS occasion, the BS may transmit beams 1 to 3 on a first PRS occasion and transmit beams 4 to 6 on a second PRS occasion. However, this is merely exemplary, and the number of available beams of the BS and the number of PRS subframes may be changed.

When the number of beams is greater than the number of PRS subframes in the PRS occasion (S2220), the BS may transmit the PRS by sweeping all beams on one PRS occasion (S2240). As described above with reference to FIGS. 1 to 21, the BS may transmit the PRS to in-coverage UEs through the available beams. In this case, if beamforming is applied, the bandwidth of the PRS may increase, thereby improving the accuracy. When the number of PRS subframes in the PRS occasion is greater than the number of available beams of the BS, the BS may transmit the PRS by sweeping the available beams on a PRS subframe basis as described above.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application. While the present disclosure has been described and illustrated herein with reference to the preferred embodiments thereof, it will be apparent to those skilled in the art that various modifications and variations can be made therein without departing from the spirit and scope of the disclosure. Thus, it is intended that the present disclosure covers the modifications and variations of this disclosure that come within the scope of the appended claims and their equivalents.

Both the method and apparatus have been described in this document. If necessary, the descriptions thereof may be complementarily applied.

INDUSTRIAL APPLICABILITY

The present disclosure is applicable not only to the 3GPP LTE and LTE-A systems but also to various wireless communication systems including IEEE 802.16x and IEEE 802.11x systems. Further, the proposed methods are applicable to a mmWave communication system using ultra-high frequency band.

The invention claimed is:

1. A method of transmitting a positioning reference signal (PRS) by a base station in a wireless communication system, the method comprising:
transmitting PRS occasion configuration information; and
transmitting the PRS on each PRS occasion based on the PRS occasion configuration information,
wherein the PRS occasion configuration information includes information on beams used on each PRS occasion,
wherein the PRS is transmitted by sweeping the beams used on each PRS occasion,
wherein the beams are swept on a PRS subframe basis in the PRS occasion, and
wherein based on the number of beams used by the base station greater than the number of PRS subframes in the PRS occasion, the PRS is transmitted by sweeping beams indicated by the PRS occasion configuration information among the beams used by the base station on a first PRS occasion and sweeping remaining beams on a second PRS occasion.

2. The method of claim 1, wherein a first beam is configured in all PRS subframes in the PRS occasion.

3. The method of claim 2, wherein the first beam covers entire coverage of the base station.

4. The method of claim 1,
wherein first and second PRSs are respectively assigned to first and second regions on each PRS occasion,
wherein the first PRS is a PRS for all in-coverage user equipments (UEs), and
wherein the second PRS is a UE-dedicated PRS for a specific UE.

5. The method of claim 4, wherein the first PRS is transmitted by sweeping beams indicated by the PRS occasion configuration information among beams used by the base station in the first region on a first PRS occasion and sweeping remaining beams in the first region on a second PRS occasion.

6. The method of claim 4, wherein the second PRS is transmitted by sweeping predetermined beams based on beamforming.

7. The method of claim 6, wherein the second PRS is transmitted by sweeping the beams used in the beamforming both in the second region on a first PRS occasion and in the second region on a second PRS occasion.

8. The method of claim 6, wherein the base station calculates the number of UEs having received power greater than or equal to a threshold for each available beam of the base station, and wherein the beams used in the beamforming are determined based on the number of the UEs.

9. The method of claim 1, wherein the PRS occasion configuration information is signaled by a physical layer signal or a higher layer signal.

10. A base station for transmitting a positioning reference signal (PRS) in a wireless communication system, the base station comprising: a receiving circuitry configured to receive a signal; a transmitting circuitry configured to transmit a signal; and a processor configured to control the receiving circuitry and the transmitting circuitry, wherein the processor is configured to: control the transmitting circuitry to transmit PRS occasion configuration information; and control the transmitting circuitry to transmit the PRS on each PRS occasion based on the PRS occasion configuration information, wherein the PRS occasion configuration information includes information on beams used on each PRS occasion, and wherein the PRS is transmitted by sweeping the beams used on each PRS occasion, wherein the beams are swept on a PRS subframe basis in the PRS occasion, and wherein based on the number of beams used by the base station greater than the number of PRS subframes in the PRS occasion, the PRS is transmitted by sweeping beams indicated by the PRS occasion configuration information among the beams used by the base station on a first PRS occasion and sweeping remaining beams on a second PRS occasion.

11. The base station of claim 10, wherein a first beam is configured in all PRS subframes in the PRS occasion, and wherein the first beam covers entire coverage of the base station.

* * * * *